May 9, 1939.　　　　　F. NEUKLIS　　　　　2,157,798
AMUSEMENT DEVICE
Filed June 17, 1938　　　2 Sheets-Sheet 1
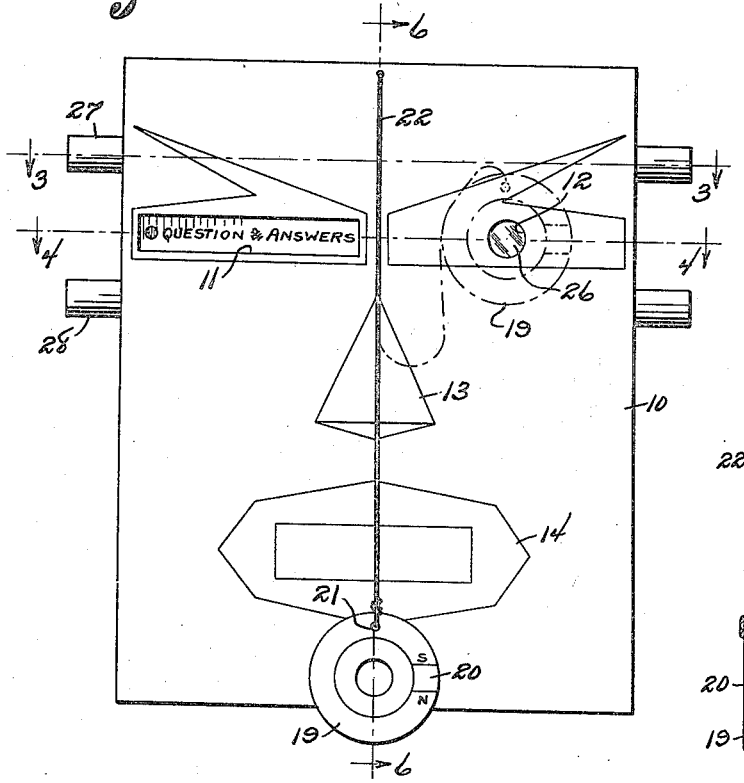
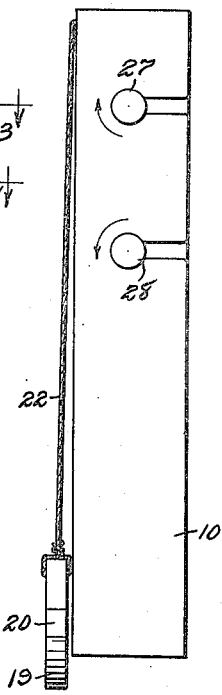
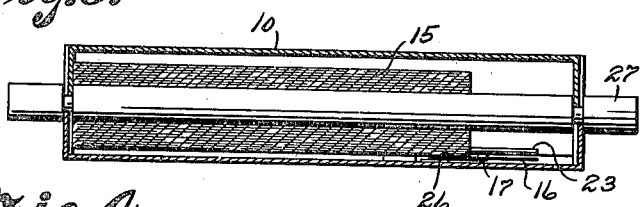
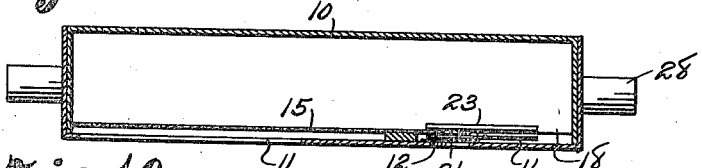
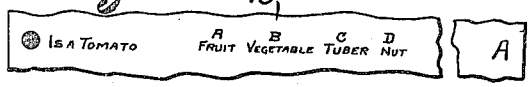
Frank Neuklis
INVENTOR
BY Victor J. Evans & Co.
ATTORNEYS May 9, 1939.  F. NEUKLIS  2,157,798
AMUSEMENT DEVICE
Filed June 17, 1938  2 Sheets-Sheet 2

Frank Neuklis
INVENTOR
BY Victor J. Evans & Co.
ATTORNEYS

Patented May 9, 1939

2,157,798

UNITED STATES PATENT OFFICE 2,157,798

AMUSEMENT DEVICE

Frank Neuklis, Tamaqua, Pa.

Application June 17, 1938, Serial No. 214,300

3 Claims. (Cl. 35—9)

This invention relates to amusement devices and has for an object to provide apparatus which will require no batteries, and which will be operated by magnetic attraction and repulsion to display a symbol corresponding to a correct answer to a question selected by the operator, the device being designed to educate, mystify, and amuse the players.

A further object is to provide apparatus of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of amusement apparatus constructed in accordance with the invention and showing the same marked to simulate a grotesque face having one eye opening exposing a web presenting questions and answers while the other eye opening houses a magnetic shutter for exposing a character corresponding to a proper answer to a question selected by the player.

Figure 2 is an end elevation of the apparatus showing the horse shoe magnet through the medium of which the player influences the electric shutter.

Figure 3 is a cross sectional view of the apparatus taken on the line 3—3 of Figure 1 and showing the web and one of the supporting shafts therefor.

Figure 4 is a cross sectional view taken on the line 4—4 of Figure 1 showing the magnetic shutter and supporting member for the web.

Figure 10 is a fragmentary plan view of the web showing a sample question, several answers thereto, and a symbol on the right edge portion which designates the correct answer.

Figure 5:
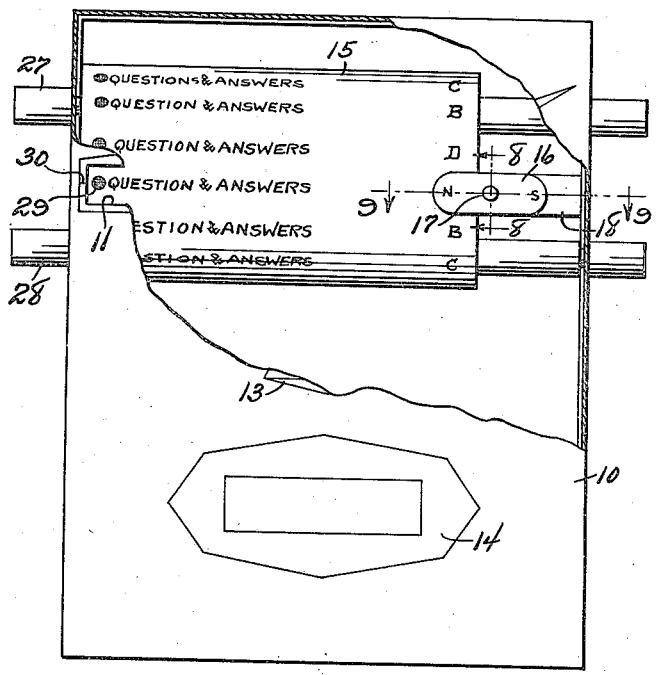
Figure 5 is a plan view of the apparatus with a portion broken away to expose the web and the magnetic shutter.
Figure 6:
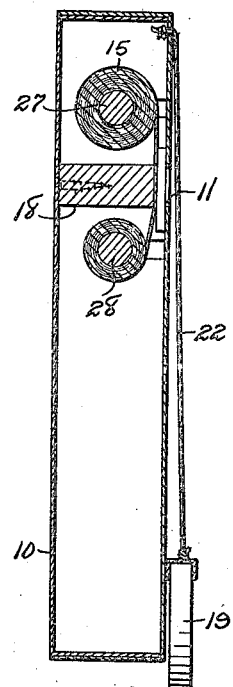
Figure 6 is a longitudinal sectional view taken on the line 6—6 of Figure 1 and showing the web, supporting rollers therefor, and support for holding the web in flat condition underneath the magnetic shutter.

Referring now to the drawings in which like characters of reference designate similar parts in the various views, 10 designates a substantially rectangular casing marked on the top to simulate a grotesque face having representation thereon of eye openings, one being a slot 11, and the other a circular opening 12, a nose 13, and a mouth 14.

The slot eye opening is adapted to expose a web 15, best shown in Figure 5, having a series of questions and answers thereon. For example, as shown in Figure 10, a sample question may be "is a tomato" and the answers "fruit, vegetable, tuber, nut". All of the answers are designated by respective symbols such as the letters A, B, C, D. One and only one, of the answers is the correct answer, and all others incorrect. The symbol of the correct answer is displayed near the right edge of the web and in this case the symbol is A as shown, designating that the correct answer is that a tomato is a fruit.

Figure 7:
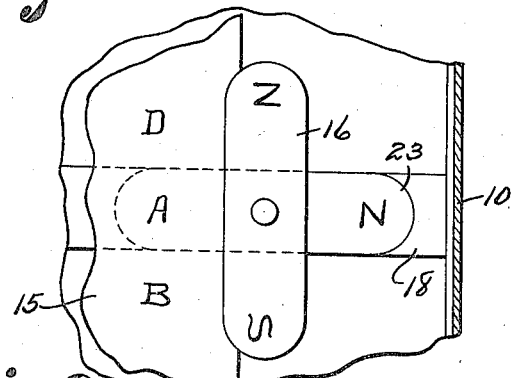
Figure 7 is a plan view showing the magnetic shutter in dotted lines in normal position and in full lines in displaced position to expose a character on the web corresponding to a proper answer to a selected question.
Figure 8:
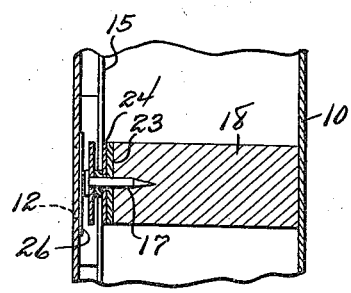
Figure 8 is a detail sectional view taken on the line 8—8 of Figure 5 showing the magnetic shutter in normal position.
Figure 9:
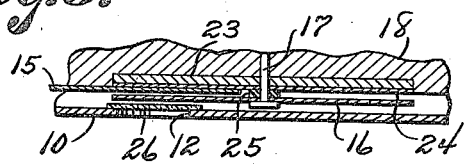
Figure 9 is a detail cross sectional view taken on the line 9—9 of Figure 5 and showing the magnetic shutter drawn to enlarged scale.

The symbol designating the correct answer is normally concealed by a permanent bar magnet shutter 16, best shown in Figure 7, which is pivoted centrally of its ends on a pivot pin 17 which projects from a wood or other non-magnetic support 18, as best shown in Figure 8. The support also extends underneath the web 15 and supports the same in flat condition at the slot 11 and circular opening 12. The shutter is normally in the position shown by dotted lines in Figure 7 and is operated by the player through the medium of a permanent horse shoe magnet 19, best shown in Figure 1.

The horse shoe magnet is in the form of a split annulus the poles of which are separated by non-magnetic material 20. The magnet is provided with an opening 21 which receives a cord 22 for attaching the magnet to the casing, the cord being sufficient in length to permit the player placing the magnet upon the casing concentric with the circular eye opening 12, and with the ends directed as shown by dotted lines in Figure 1. When the magnet is so placed the magnetic shutter 16 will be displaced to the position shown in full lines in Figure 7 and expose the symbol on the web designating the correct answer to the question selected by a player.

To return the magnetic shutter 16 to normal position after each actuation a bar magnet 23 is countersunk in the support 18 and a sheet of paper 24 may be secured to the face of the magnet if desired. The magnet is separated by an insulating washer 25 by the magnetic shutter 16. The poles of this bar magnet are reversed with respect to the poles of the magnetic shutter so that after the latter is displayed by the horse shoe magnet 19, which is stronger than the bar magnet, it will be returned by the bar magnet 23 to normal position as soon as the horse shoe magnet 19 is removed by the player from the eye opening 12 preparatory to selecting another question and answer.

A pane 26 of Cellophane or other transparent material is disposed over the eye opening 12. Through this pane the symbol designating the correct answer to a selected question may be viewed by the player when the magnetic shutter is displaced, to operative position as shown in full lines in Figure 7.

The web 15 is wound upon two shafts 27 and 28, the ends of which project from the sides of the casing 10 to form handles through the medium of which the shafts may be selectively rotated to feed the web from one shaft to the other.

In using the apparatus the player rotates one of the shafts until a desired question appears in the slot 11. The player must take care to bring a dot or other aligning mark 29 into registration with a line 30 displayed on the casing so that the symbol designating the correct answer to the question will be disposed directly under the magnetic shutter as best shown in Figure 5. An example of the question has been previously given and in this question should the player decide that the word "vegetable" is the correct answer he may then find out what the correct answer really is by placing the horse shoe magnet 19 concentric with the circular eye opening 12. The magnetic shutter 16 is immediately displaced to the full line position shown in Figure 7 and exposes the symbol designating the correct answer, which in this case is the symbol A and the player thus may learn that his selected answer is incorrect and the proper answer to the question is that a tomato is a fruit.

From the above description it is thought that the construction and operation of the invention will be fully understood without further explanation.

What is claimed is:

1. In a magnetically operated game, a game board having spaced openings therein, a manually operated web movable in a path underneath both openings, said web displaying questions and possible answers only one of which is correct exposed through one of the openings and displaying a symbol designating the correct answer through the other opening, a bar magnet forming a shutter pivoted on the board and normally concealing said symbol, and a manually operable horse shoe magnet adapted to be applied to the board with the poles thereof disposed perpendicular to the poles of the shutter for displacing the shutter to expose said symbol.

2. In a magnetically operated game, a casing forming a game board having spaced openings therein, one of said openings being in the form of a slot and the other of said openings being in the form of a circle, spaced manually turnable shafts projecting from the sides of the casing, a web windable upon said shafts within the casing, a support for the web holding the web in flat condition at said openings, said web displaying questions and possible answers only one of which is correct exposed through said slot and displaying a symbol displaying the correct answer through the circular opening, a bar magnet forming a shutter pivoted intermediate its ends on said support and normally concealing said symbol, and a manually operable horse shoe magnet adapted to be applied to the casing at said circular opening with the poles thereof disposed perpendicular with the poles of the shutter for displacing the shutter to expose said symbol through said circular opening.

3. In a magnetically operated game, a casing forming a game board having representations thereon of the eyes, nose and mouth of a robot, a manually operated web in the casing movable longitudinally thereof, said eye representations having openings therein, one of the openings being a slot and the other opening being a circular opening, the web being movable underneath both openings and displaying questions and possible answers only one of which is correct, exposable through the slots and displaying a symbol designating the correct answer exposable through the circular opening, a bar magnet forming a shutter pivotally mounted on the casing and normally concealing said symbol, and a manually operable horse shoe magnet adapted to be applied to said circular opening with the poles thereof disposed perpendicular to the poles of the shutter for displacing the shutter to expose said symbol.

FRANK NEUKLIS.